(12) United States Patent  (10) Patent No.: US 8,465,085 B1
Tradup  (45) Date of Patent: Jun. 18, 2013

(54) TRAILER ASSEMBLY

(76) Inventor: Ed Tradup, Brewster, WA (US)

( * ) Notice: Subject to any disclaimer, the term of this patent is extended or adjusted under 35 U.S.C. 154(b) by 139 days.

(21) Appl. No.: 13/175,255

(22) Filed: Jul. 1, 2011

(51) Int. Cl.
 B62B 1/00 (2006.01)
(52) U.S. Cl.
 USPC .......... 296/186.4; 296/37.5; 280/656
(58) Field of Classification Search
 USPC .............. 296/186.4, 37.5; 280/656
 See application file for complete search history.

(56) References Cited

U.S. PATENT DOCUMENTS

| 3,492,042 | A | * | 1/1970 | Nachtigall, Jr. | 296/24.45 |
| 3,582,131 | A | * | 6/1971 | Brown | 296/26.02 |
| 3,724,893 | A | * | 4/1973 | Giroux | 296/173 |
| 4,055,206 | A | * | 10/1977 | Griffin | 144/285 |
| D249,138 | S | | 8/1978 | Butler | |
| 4,556,248 | A | | 12/1985 | Kobayashi | |
| 5,069,471 | A | | 12/1991 | Van Der Linden et al. | |
| 5,310,209 | A | * | 5/1994 | Holman | 280/656 |
| 5,383,703 | A | | 1/1995 | Irvine, III | |
| 6,283,537 | B1 | | 9/2001 | DeVore, III | |
| 6,296,297 | B1 | * | 10/2001 | Barrow et al. | 296/173 |
| 6,739,617 | B1 | * | 5/2004 | Martin | 280/656 |
| 6,817,653 | B2 | | 11/2004 | Ropp | |
| 2011/0204601 | A1 | * | 8/2011 | Alvarino | 280/656 |

* cited by examiner

Primary Examiner — Kevin Hurley

(57) ABSTRACT

A trailer assembly includes a platform that has a front edge, a rear edge, a first lateral edge, a second lateral edge, an upper surface and a lower surface. A pair of wheels is rotatably coupled to the platform and a hitch coupler is attached to and extends forward of the platform. A first housing is fixedly attached to the platform and extends along the first lateral edge. A second housing is pivotally coupled to the first housing. The second housing is positionable in a stored position positioned over the platform extending along the second lateral edge or in a deployed position swung outwardly away from the platform. The first and second housings each haves a plurality of compartments therein for storing tools and automotive parts.

10 Claims, 6 Drawing Sheets

TRAILER ASSEMBLY

BACKGROUND OF THE DISCLOSURE

Field of the Disclosure

The disclosure relates to trailer devices and more particularly pertains to a new trailer device for transporting a vehicle as well a plurality of tools and automotive parts.

SUMMARY OF THE DISCLOSURE

An embodiment of the disclosure meets the needs presented above by generally comprising a platform that has a front edge, a rear edge, a first lateral edge, a second lateral edge, an upper surface and a lower surface. A pair of wheels is rotatably coupled to the platform wherein one of the wheels is positioned adjacent to the first lateral edge and one of the wheels is positioned adjacent to the second lateral edge. A hitch coupler is attached to and extends forward of the platform. A first housing is attached to and extends upwardly from the top side of the platform. The first housing extends between the front and rear edges and is positioned adjacent to and extends along the first lateral edge. The first housing is in a fixed position relative to the platform. The first housing has a plurality of first compartments therein. A second housing is pivotally coupled to the first housing. The second housing is positionable in a stored position positioned over the platform extending between the front and rear edges and along the second lateral edge. The second housing is also positionable in a deployed position swung outwardly away from the platform. The second housing has an exterior wall facing away from the first housing when the second housing is in the stored position. The exterior wall is positionable in a same plane as the outer wall when the second housing is placed in the deployed position. The second housing has a plurality of second compartments therein.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
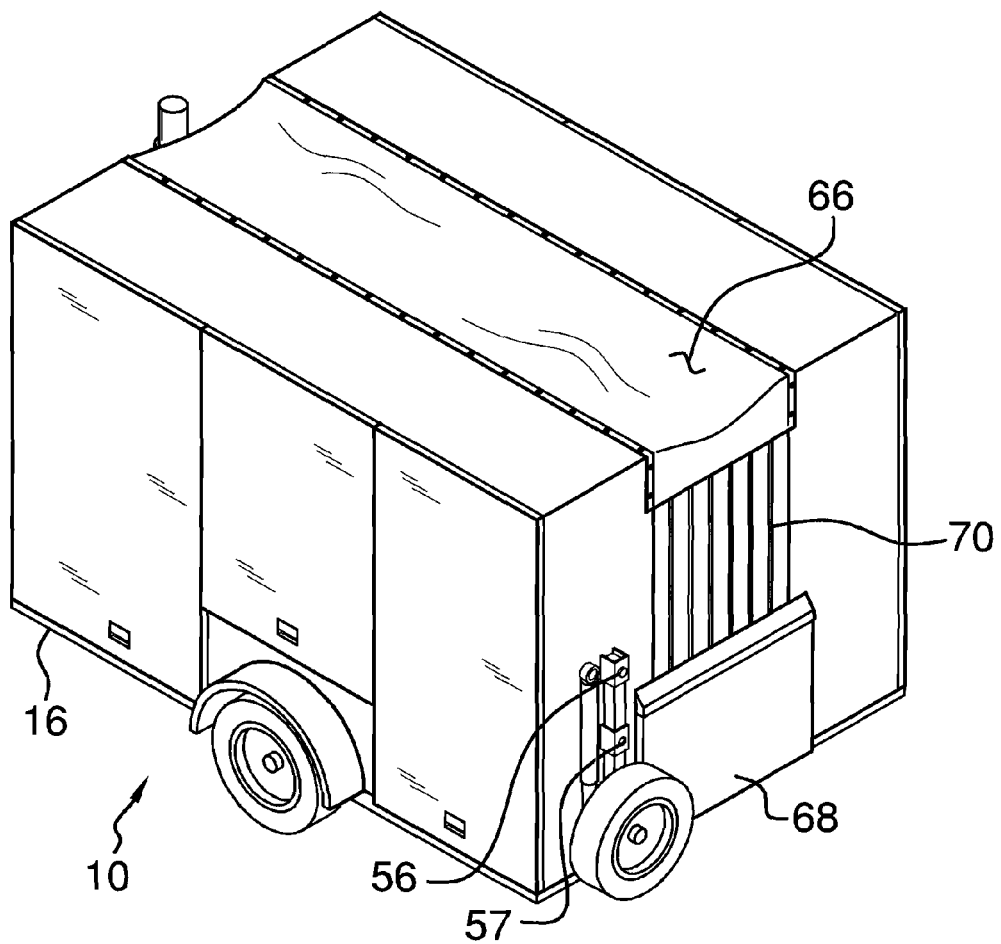
FIG. 1 is a rear perspective view of a trailer assembly according to an embodiment of the disclosure in a closed position

With reference now to the drawings, and in particular to FIGS. 1 through 6 thereof, a new trailer device embodying the principles and concepts of an embodiment of the disclosure and generally designated by the reference numeral 10 will be described.

As best illustrated in FIGS. 1 through 6, the trailer assembly 10 generally comprises a platform 12 that has a front edge 14, a rear edge 16, a first lateral edge 18, a second lateral edge 20, an upper surface 22 and a lower surface 24. A pair of wheels 25, 26 is rotatably coupled to the platform 12. One of the wheels 25 is positioned adjacent to the first lateral edge 18 and one of the wheels 26 is positioned adjacent to the second lateral edge 20. It should be understood that the number of wheels 25, 26 can be increased as needed depending upon the size and load bearing capabilities of the assembly 10. A hitch coupler 28 is attached to and extends forward of the platform 12. The hitch coupler 28 is conventional and may comprise either a male or female hitch depending on the type of hitch coupling the assembly 10 to a vehicle.

A first housing 30 is attached to and extends upwardly from the top side 22 of the platform 12. The first housing 30 extends between the front 14 and rear 16 edges and is positioned adjacent to and extends along the first lateral edge 16. The first housing 30 is in a fixed, defined herein as non-movable, position relative to the platform 12. The first housing 30 has an outer wall 32 facing away from the second lateral edge 20 and includes a plurality of first compartments 34 therein. The outer wall 32 has a plurality of doors 36 therein to access the plurality of first compartments 34 positioned in the first housing 30. The first compartments 30 may comprise drawers as is shown in the Figures.

Figure 2:
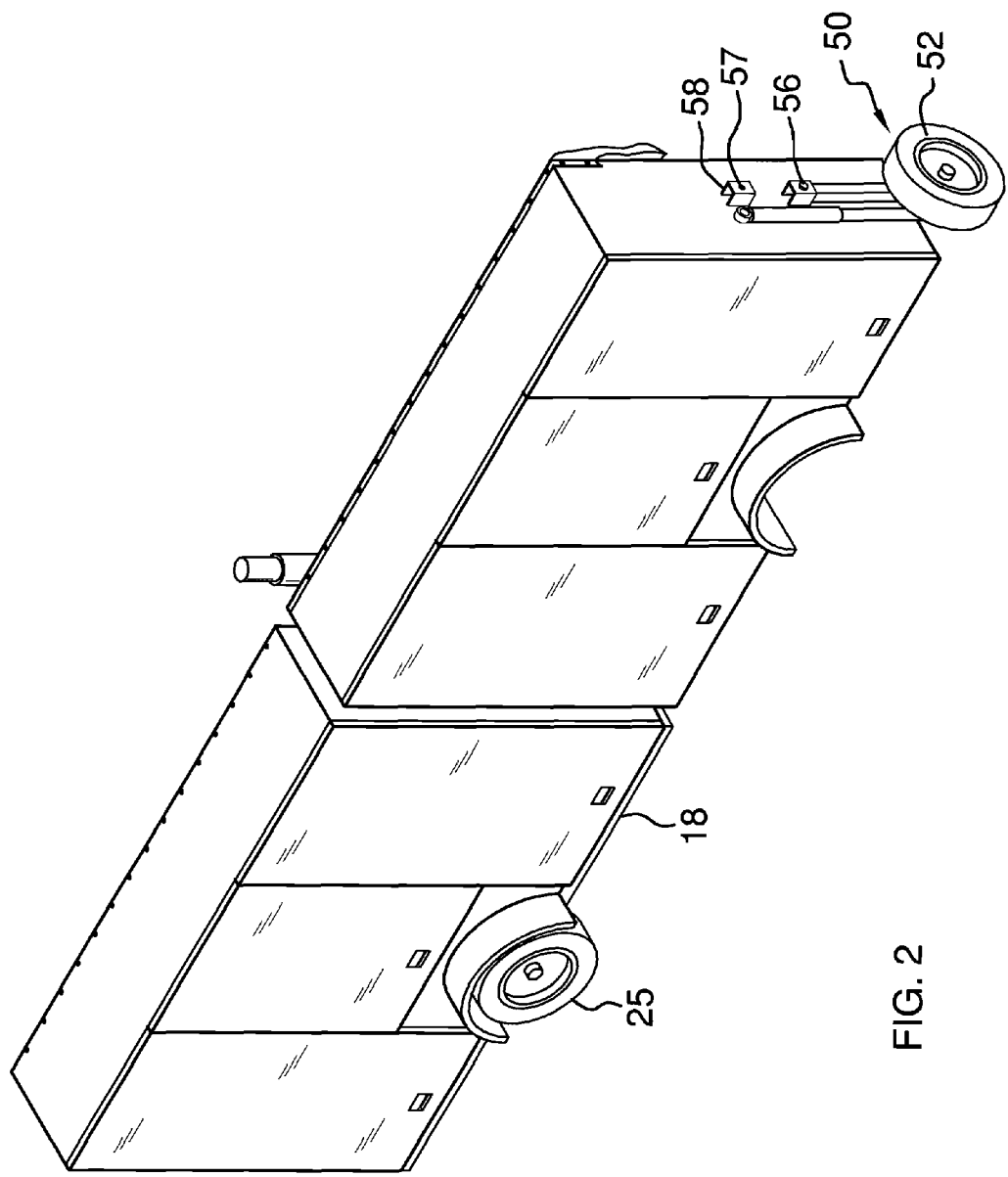
FIG. 2 is a front perspective view of an embodiment of the disclosure in an open position.
Figure 5:
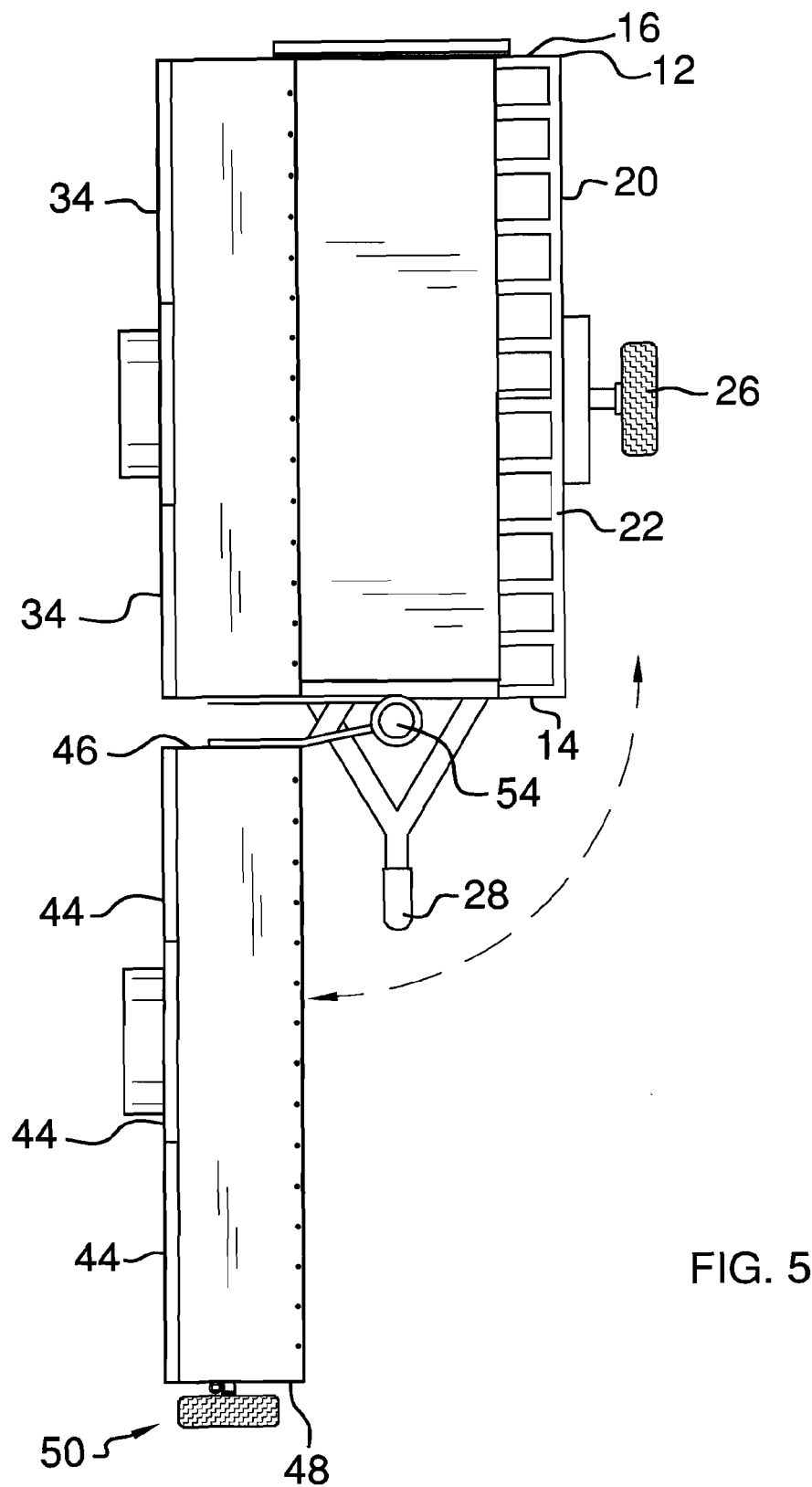
FIG. 5 is a top view of an embodiment of the disclosure in an open position.
Figure 6:
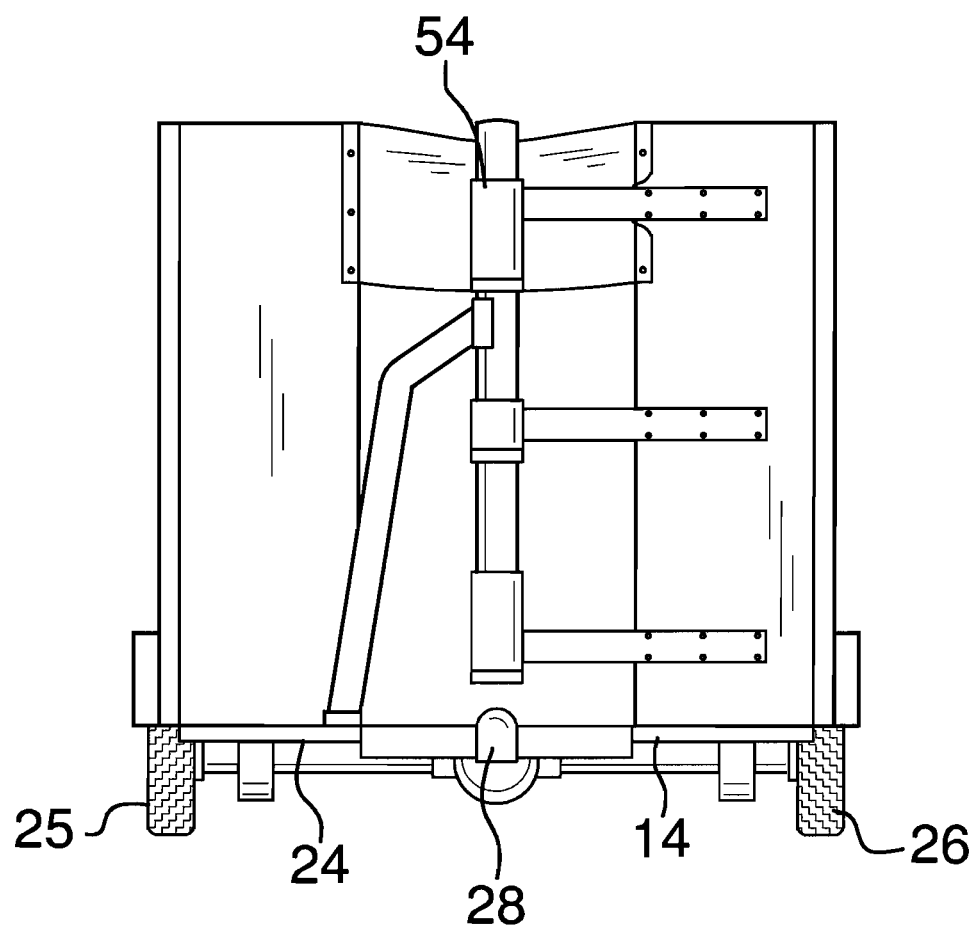
FIG. 6 is a front view of an embodiment of the disclosure in a closed position.

A second housing 38 is pivotally coupled to the first housing 30. The second housing 38 is positionable in a stored position positioned over the top side 22 of the platform 12. The second housing 38 extends between the front 14 and rear edges 16 and along the second lateral edge 20 when the second housing 38 is in the stored position. The second housing 38 is positionable in a deployed position swung outwardly away from the platform 12 as is shown in FIG. 5. The second housing 38 has an exterior wall 40 facing away from the first housing 30 when the second housing 38 is in the stored position. The exterior wall 40 is positionable in a same plane as the outer wall 32 when the second housing 38 is placed in the deployed position as is shown in FIG. 2. The second housing 38 has a plurality of second compartments therein 42. As with the first housing 30, the exterior wall 40 may have a plurality of doors 44 therein for accessing the plurality of second compartments 42 positioned in the second housing 38. Also again, the second compartments 42 may comprise a plurality of drawers. The second housing 38 may be retained in the stored position by any conventional manner such as a locking bolt, not shown.

The second housing 38 has a first end wall 46 and a second end wall 48. The first end wall 46 is pivotally coupled to the first housing 30. A support 50 is attached to the second end wall 48 and supports the second housing 38 on a support surface when the second housing 38 is in the deployed position. The support 50 includes a support wheel 52 that is abuttable against the support surface and rolls along the support surface as the second housing 38 is moved between the stored position and the deployed position. In particular, the wheel 52 will have a rotational axis oriented perpendicular to an axis of rotation of the hinge 54 coupling together the first 30 and second 38 housings. The support wheel 52 is vertically movable with respect to the second housing 38. The support wheel 52 may thereby be raised when not in used and lowered as needed to support the second housing 38 or accommodate differentiations in the support surface. The lowering or raising of the support wheel 52 may be achieved through any conventional means such as but not limited to mechanical, pneumatic or hydraulic jack assemblies 55, or simply by locking the support wheel at a selected height with a pin 56 extended through an aperture 57 in one or more locking brackets 58. The pin 56 may be used with a jack assembly 55 to ensure that the supporting feature does not fail during movement of the second housing 38.

The first housing 30 has an inner wall 60 facing an interior wall 62 of the second housing 38 when the second housing is in the stored position. The inner 60 and interior 62 walls are spaced from each other a distance greater than 0.75 m when the second housing 38 is in the closed position. This receiving space allows a relatively thin vehicle or motorcycle to be positioned between the first 30 and second 38 housings when the second housing 38 is in the stored position. Each of the first 30 and second 38 housings has a top wall 64. A covering 66 is removably attached to and extended between the top walls 64 of the first 30 and second 38 housings. The covering 66 may comprise a flexible tarp snappily coupled to the top walls 64. A ramp 68 is pivotally attached to the rear edge 16 of the platform 12 to facilitate entering and exiting a space between the first 30 and second 38 housings when the second housing 38 is in the stored position. A door or gate 70 may be positioned at the rear edge 16 as well, particularly if the ramp 68 and covering 66 do not completely close an entrance to the space between the first 30 and second 38 housings.

Figure 3:
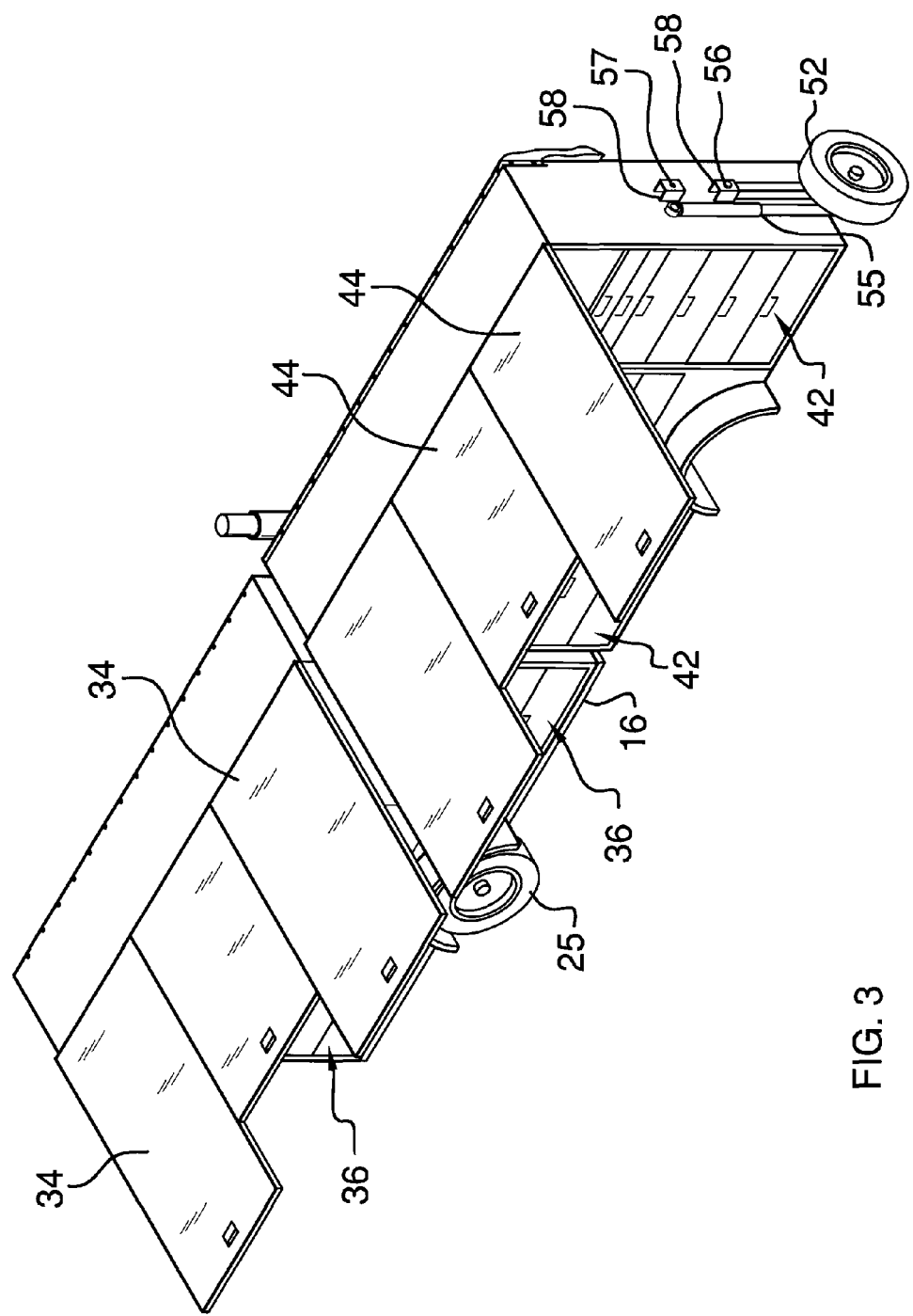
FIG. 3 is a front perspective view of an embodiment of the disclosure in an open position
Figure 4:
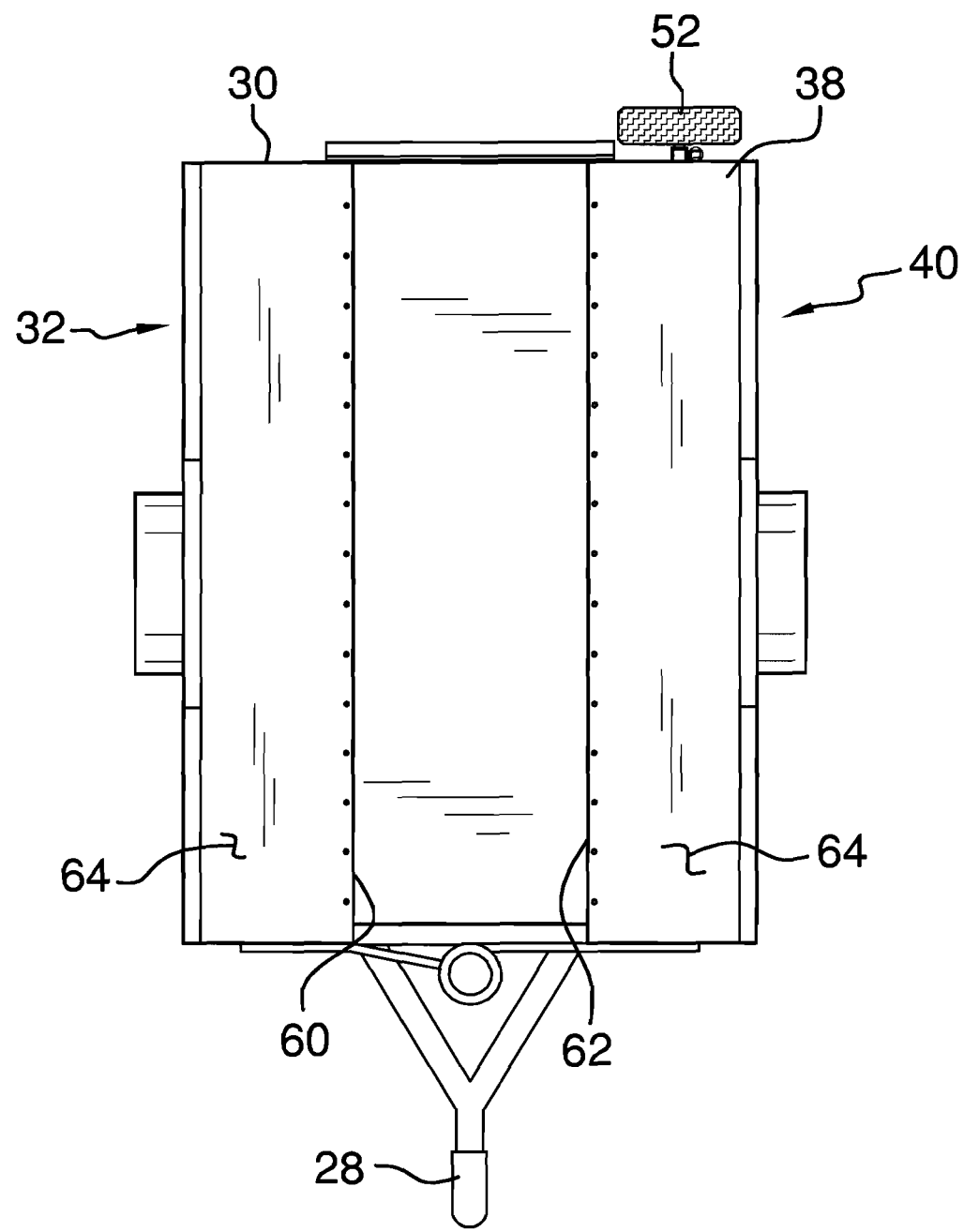
FIG. 4 is a top view of an embodiment of the disclosure in a closed position.

In use, the assembly 10 allows a person to tow not only a vehicle but also a large number of tools and vehicle parts which may be used to work on the vehicle. The ability to swing the second housing outwardly from the platform 12 positions all of the compartments 36, 42 in alignment with each other and on the same side of the platform 12 as is shown in FIG. 3. This will provide much faster and convenient access to all of a person's tools and parts. In particular, such a design is well suited to land speed vehicles which are relatively thin but which often require small repairs or adjustments in between timed runs.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A trailer assembly configured to hold a plurality of tools and a vehicle, said trailer assembly including:
   a platform having a front edge, a rear edge, a first lateral edge, a second lateral edge, an upper surface and a lower surface;
   a pair of wheels being rotatably coupled to said platform, one of said wheels being positioned adjacent to said first lateral edge and one of said wheels being positioned adjacent to said second lateral edge;
   a hitch coupler being attached to and extending forward of said platform;
   a first housing being attached to and extending upwardly from said top side of said platform, said first housing extending between said front and rear edges, said first housing being positioned adjacent to and extending along said first lateral edge, said first housing being in a fixed position relative to said platform, said first housing having a plurality of first compartments therein, said first housing having an outer wall facing away from said second lateral edge; and
   a second housing being pivotally coupled to said first housing, said second housing being positionable in a stored position positioned over said platform, said second housing extending between said front and rear edges and along said second lateral edge when said second housing is in said stored position, said second housing being positionable in a deployed position swung outwardly away from said platform, said second housing having an exterior wall facing away from said first housing when said second housing is in said stored position, said exterior wall being positionable in a same plane as said outer wall when said second housing is placed in said deployed position, said second housing having a plurality of second compartments therein.

2. The assembly according to claim 1, wherein said outer wall has a plurality of doors therein to access said plurality of first compartments positioned in said first housing, said exterior wall having a plurality of doors therein to access said plurality of second compartments positioned in said second housing.

3. The assembly according to claim 1, wherein said second housing has a first end wall and a second end wall, said first end wall being pivotally coupled to said first housing, a support being attached to said second end wall and supporting said second housing on a support surface when said second housing is in said deployed position.

4. The assembly according to claim 3, wherein said support includes a support wheel being abuttable against the support surface and rolling along the support surface as said second housing is moved between said support position and said stored position.

5. The assembly according to claim 4, wherein said support wheel is vertically movable with respect to said second housing.

6. The assembly according to claim 1, wherein said first housing has an inner wall facing an interior wall of said second housing when said second housing is in said stored position, said inner and interior walls being spaced from each other a distance greater than 0.75 m when said second housing is in said closed position.

7. The assembly according to claim 6, wherein each of said first and second housing has a top wall, a covering being removably attached to and extended between said top walls of said first and second housings.

8. The assembly according to claim 7, further including a ramp being pivotally attached to said rear edge of said platform to facilitate entering and exiting a space between said first and second housings when said second housing is in said closed position.

9. The assembly according to claim 6, further including a ramp being pivotally attached to said rear edge of said platform to facilitate entering and exiting a space between said first and second housings when said second housing is in said closed position.

10. A trailer assembly configured to hold a plurality of tools and a vehicle, said trailer assembly including:
- a platform having a front edge, a rear edge, a first lateral edge, a second lateral edge, an upper surface and a lower surface;
- a pair of wheels being rotatably coupled to said platform, one of said wheels being positioned adjacent to said first lateral edge and one of said wheels being positioned adjacent to said second lateral edge;
- a hitch coupler being attached to and extending forward of said platform;
- a first housing being attached to and extending upwardly from said top side of said platform, said first housing extending between said front and rear edges, said first housing being positioned adjacent to and extending along said first lateral edge, said first housing being in a fixed position relative to said platform, said first housing having an outer wall facing away from said second lateral edge, said first housing including a plurality of first compartments therein, said outer wall having a plurality of doors therein to access said plurality of first compartments positioned in said first housing;
- a second housing being pivotally coupled to said first housing, said second housing being positionable in a stored position positioned over said platform, said second housing extending between said front and rear edges and along said second lateral edge when said second housing is in said stored position, said second housing being positionable in a deployed position swung outwardly away from said platform, said second housing having an exterior wall facing away from said first housing when said second housing is in said stored position, said exterior wall being positionable in a same plane as said outer wall when said second housing is placed in said deployed position, said second housing having a plurality of second compartments therein, said exterior wall having a plurality of doors therein to access said plurality of second compartments positioned in said second housing;
- said second housing having a first end wall and a second end wall, said first end wall being pivotally coupled to said first housing;
- a support being attached to said second end wall and supporting said second housing on a support surface when said second housing is in said deployed position, said support including a support wheel being abuttable against the support surface and rolling along the support surface as said second housing is moved between said support position and said stored position, said support wheel being vertically movable with respect to said second housing;
- said first housing having an inner wall facing an interior wall of said second housing when said second housing is in said stored position, said inner and interior walls being spaced from each other a distance greater than 0.75 m when said second housing is in said closed position;
- each of said first and second housing having a top wall;
- a covering being removably attached to and extended between said top walls of said first and second housings; and
- a ramp being pivotally attached to said rear edge of said platform to facilitate entering and exiting a space between said first and second housings when said second housing is in said closed position.

* * * * *